United States Patent [19]
Holub

[11] 3,870,338
[45] Mar. 11, 1975

[54] DUAL TRICYCLE KIT

[76] Inventor: Frank W. Holub, 1440 Columbus Ave., Burlingame, Calif. 94010

[22] Filed: Aug. 2, 1973

[21] Appl. No.: 385,061

[52] U.S. Cl. ............................. 280/209, 280/231
[51] Int. Cl. ............................................ B62k 13/06
[58] Field of Search ......... 280/7.1, 7.15, 7.16, 209, 280/231, 273

[56] References Cited
UNITED STATES PATENTS

| 615,796 | 12/1898 | Brosnihan | 280/231 |
| 707,122 | 8/1902 | Kynaston | 280/209 |
| 3,175,843 | 3/1965 | Burke | 280/209 |
| 3,368,823 | 2/1968 | Templeton | 280/7.15 |

*Primary Examiner*—Lloyd L. King
*Assistant Examiner*—Reinhard J. Eisenzopf

[57] ABSTRACT

This device consists primarily of a rear frame and a front frame which are attachable to a pair of standard bicycle frames, the rear frame includes sleeve and shaft means carrying a plurality of sprockets for driving the rear wheels, the drive being a secondary chain by the two chains in sprocket of the standard bicycle frames which are a pair and the front frame includes tie-rod means for effecting steering of the device.

1 Claim, 4 Drawing Figures

PATENTED MAR 11 1975　　　　　　　　　3,870,338
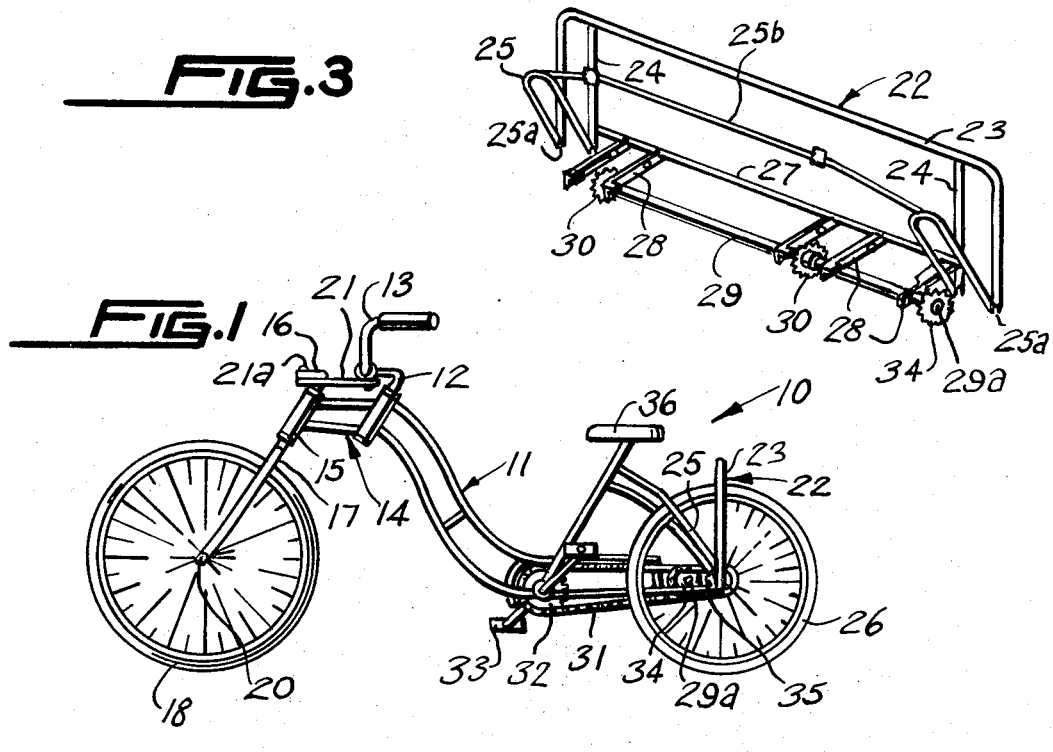
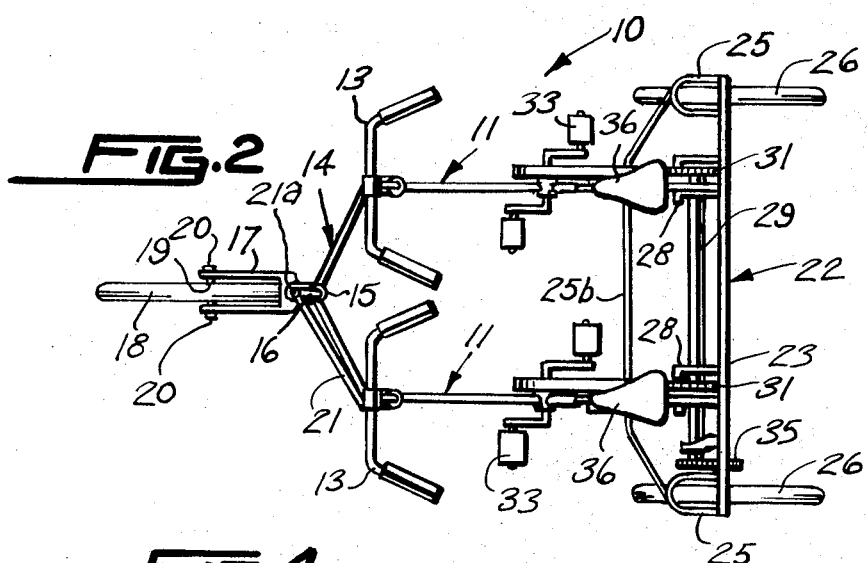
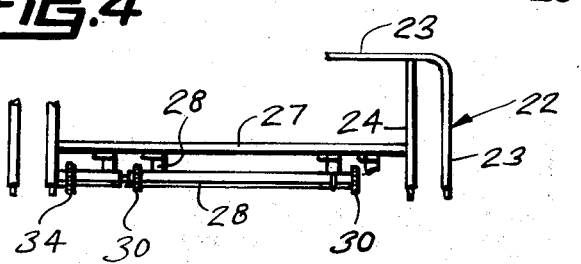

DUAL TRICYCLE KIT

This invention relates to bicycles and the like.

It is therefore the principal object of this invention to provide a dual tricycle kit which will convert two standard bicycle frames into a tricycle which will seat the occupants side by side.

Another object of this invention is to provide a tricycle kit which will utilize the standard sprockets and chains of the two standard cicycle frames to drive the rear wheels through a secondary chain and sprockets.

A further object of this invention is to provide a dual tricycle kit which will be of such construction so as to be disassembled from the two standard bicycle frames if the users desire to convert the original bicycles to single seat and drive.

Other objects of the invention are to provide a dual tricycle kit which is simple in design, inexpensive to manufacture, rugged in construction, easy to use and efficient in operation.

These and other objects will be readily evident upon a study of the following specification and the accompany drawing, wherein:

FIG. 1 is a side view of the present invention shown in elevation;

FIG. 2 is a top plan view of FIG. 1;

FIG. 3 is a perspective view of the rear axle portion of the invention which is shown removed from figure 1; and FIG. 4 is a fragmentary rear view of FIG. 3 shown in elevation.

According to this invention, a dual tricycle kit 10 is shown to be installed onto a pair of standard bicycle frames 11 each having the standard goose necks 12 and handle bars 13. A front frame 14 is secured and extends from the frames 11 and includes a sleeve 15 carrying a neck portion 16 and a fork 17 in which is rotatably carried the front wheel 18. Front wheel 18 is carried upon an axle 19 and is secured within fork 17 by means of nut fasteners 20. A tie-rod 21 is fastened to the left handle bar 13 and the neck 16 by means of bolt fasteners 21a.

A rear frame 22 of kit 10 consists of a U-shaped bar or tube 23 having vertical cross bar members 24 secured to bar 23 in a parallel spaced manner, A U-shaped yoke 25 is fixedly secured to the ends of bar 23 and bars 24, and the openings 25a of yokes 25, serve to receive the shaft portion of frame 22. The yokes 25, each freely receive, therein, a rear wheel 26 which serves to convert the standard bicycle frames 11 into a tricycle. The yokes 25 are fixedly secured to a bar 25b of frame 22 which serves to impart maximum rigidity to frame 22. A cross bar 27 is fixedly secured to and between bars 24 and has welded to it or otherwise secured to it, a plurality of extending brackets 28 which are mounted to sleeves 29 carrying shaft 29a. Fixedly secured to shafts 29a, are a pair of sprockets 30 which carry the standard bicycle chains 31 which engage the standard sprockets 32 of frames 11. The sprockets 32 are rotatable, by means of the foot pedals 33 of the standard bicycle frames 11. A sprocket 34 is also fixedly secured to shaft 29a and it carries a second chain 35 which serves to drive the rear wheels 26.

The rear frame 22 of kit 10 is bolted to the frames 11 at the point where the rear wheels are attached and also at a point below the pair of seats 36 at the seat post clamps (not shown).

It will be noted that the left rear wheel 26 may carry a single speed coaster brake or a three speed brake taken from the original bicycles.

What I claim is:

1. A dual tricycle kit for attaching a pair of standard bicycle frames in side-by-side relationship, each frame having a front portion, a rear portion and a drive chain, said kit comprising:

a front assembly having (a) a wheel for supporting the front of the dual tricycle, (b) fork means rotatably carrying said wheel, (c) means for fastening said fork means midway between the front portion of each bicycle frame, (d) tie-rod means for connecting said fork with one bicycle frame for enabling steering of the dual tricycle; and a rear assembly having (a) a shaft, said shaft being longer than the distance between the assembled bicycle frames, (b) two drive sprockets, one of said sprockets being mounted at an end of said shaft, the other of said sprockets being mounted on said shaft a distance equal to the spacing between the assembled bicycle frames from said end, (c) two wheels for supporting the rear of the dual tricycle, (d) rear frame means having (1) bar means, said bar means being longer than said shaft, (2) yoke means at each end of said bar means for rotatably carrying said wheels, (3) means for rotatably supporting said shaft such that the other end of said shaft is adjacent to one of said wheels, (4) means for rigidly attaching the rear portion of each bicycle frame to said bar means such that the drive chain of each bicycle frame can be connected to one of said drive sprockets, and (e) means connecting said other end of said shaft to said adjacent wheel for driving the wheel upon rotation of said shaft.

* * * * *